Figure 1:
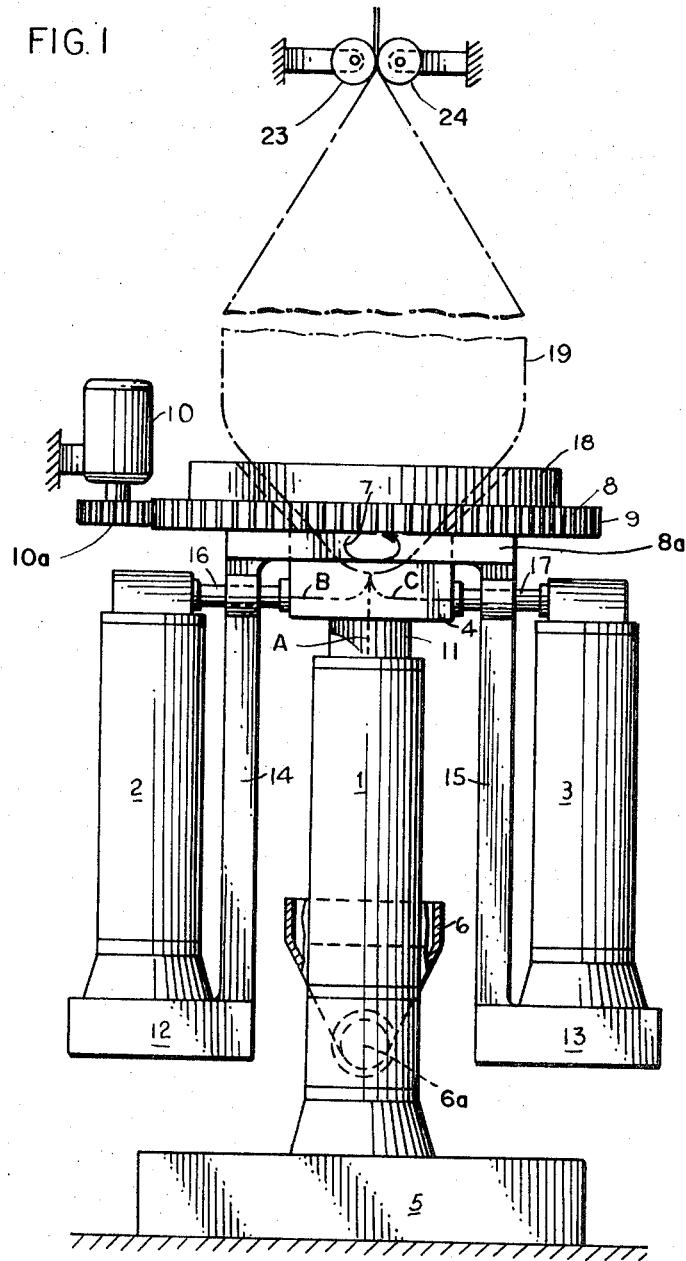

United States Patent
Schippers

[15] 3,650,649
[45] Mar. 21, 1972

[54] APPARATUS FOR PRODUCING A MULTI-LAYER BLOWN TUBULAR THERMOPLASTIC FILM

[72] Inventor: Heinz Schippers, Remscheid-11, Germany

[73] Assignee: Barmag Barmer Maschinenfabrik Aktiengesellschaft, Wuppertal, Germany

[22] Filed: Aug. 3, 1970

[21] Appl. No.: 60,390

[30] Foreign Application Priority Data

Aug. 2, 1969 Germany.....................P 19 39 528.9

[52] U.S. Cl..............................425/131, 264/95, 425/325, 425/404
[51] Int. Cl.......................................................B29d 23/04
[58] Field of Search....................18/14 G, 14 RR, 14 B, 14 S, 18/14 P, 13 P, 13 RR

[56] References Cited

UNITED STATES PATENTS

| | | | |
|---|---|---|---|
| 2,844,846 | 7/1958 | Kronholm | 18/14 S |
| 2,848,747 | 8/1958 | Dixon | 18/13 P X |
| 2,937,402 | 5/1960 | Pierce | 18/14 RR |
| 3,020,588 | 2/1962 | Ferguson et al | 18/14 S X |
| 3,223,761 | 12/1965 | Raley | 18/13 P X |

Primary Examiner—J. Spencer Overholser
Assistant Examiner—Ben D. Tobor
Attorney—Johnston, Root, O'Keeffe, Keil, Thompson & Shurtleff

[57] ABSTRACT

Apparatus for the continuous extrusion of a multi-layer blown tubular thermoplastic film wherein the extrusion die is rotatably mounted about a vertical extrusion axis in feed connection with an extruder in which the screw axis coincides with the vertical extrusion axis and also in feed connection with one or more additional extruders mounted for rotation together with the die, preferably with a common drive means and support for the die and the interconnected additional extruders.

10 Claims, 2 Drawing Figures

Patented March 21, 1972

3,650,649

2 Sheets-Sheet 1

INVENTOR:
HEINZ SCHIPPERS
BY
Johnston, Root, O'Keeffe, Keil, Thompson & Shurtleff
ATT'YS

APPARATUS FOR PRODUCING A MULTI-LAYER BLOWN TUBULAR THERMOPLASTIC FILM

Various devices or extrusion apparatus for the continuous production of blown tubular films from thermoplastic materials, e.g., thermoplastic polymers, are generally known and are used for the manufacture of single-layer or multiple-layer blown films.

Apparatus for the production of only a single-layer film normally includes a single extruder in which the thermoplastic material to be processed is melted and continuously delivered by a screw to an extrusion die which is in the form of an annular gap die. After cooling, the blown and relatively thin tubular film being withdrawn from the die is flattened by suitable means, usually including two nip rollers, and then wound up or otherwise collected. Air or another suitable gas can be introduced into the tubular film, e.g., through a central opening in the die, under a slight excess pressure so that immediately after leaving the die, i.e., while it is still thermoplastic, the tube is expanded to a certain extent and its wall thickness reduced accordingly. Transverse stretching can be accomplished by this blowing or lateral expansion of the freshly extruded tube, and biaxial stretching can also take place by imparting an additional longitudinal stretch or draw as the tube is withdrawn.

In known apparatus, the extruder may be either in the form of a horizontal extruder or in the form of a vertical extruder, i.e., with reference to the longitudinal screw axis. To prevent the tubular film from being deposited on the flattening or winding rollers at always the same position, as a result of which differences in wall thickness would accumulate where the film is flattened and collected, it is known that a slow relative movement can be produced between the extrusion die on the one hand and the nip rollers and winding means on the other hand. This relative movement can be obtained by mounting a horizontal extruder together with a pivotal extrusion head or die operating in the vertical direction on a common rotating base, or by keeping the extruder stationary and slowly rotating the extrusion die.

A vertical extruder with an extrusion die fitted directly to it can also be used for this purpose, being mounted together with the extruder feed assembly on a common rotating base.

Apparatus for the production of multiple-layer blown tubular films are also known. In machines of this kind, a number of extruders corresponding to the number of layers to be produced are connected to a common extrusion die in the form of a blow head. The apparatus can be constructed in such a manner that the melt streams coming from the extruders are combined with one another before entering the die so that, after they have been combined, they flow in the form of tubular or rodlike layers arranged coaxially one inside the other. The coaxial or concentric layers then enter the extrusion die where they are conically widened and fed to the annular extrusion slot.

In other known arrangements, the extrusion die comprises several annular slots arranged concentrically one within the other from which the melt streams delivered by individual extruders emerge separately and are combined with one another shortly after emerging from the die, i.e., while they are still thermoplastic. However, arrangements are also known in which individual melt streams separately delivered to the die are combined with one another inside the die and then emerge from the annular extrusion slot of the die in the form of a composite tubular film. The problem of correcting inevitable differences in wall thickness, so that such differences are unable to accumulate where the film is contacted with rollers, is also encountered in apparatus for the production of the multilayer tubular films. In this case, a relative movement is also desired between the extrusion die on the one hand and the nip rolls and winding means on the other hand.

The need to combine different molten polymer materials either before or within the die for the production of multilayer blown films gives rise to considerable design problems. For example, it is almost impossible to prevent the molten materials from being more or less considerably deflected outside or inside of the extrusion die with the result that their residence times on their way from the extruder outlet to the point at which they emerge from the annular die differ considerably depending upon geometric factors in the design. With some thermoplastic materials, for example in the case of polyvinyl chloride or vinyl chloride copolymers, this divergent or deflected flow results in decomposition phenomena and leads to difficulties in adhesion to the adjacent layer which consists of a different thermoplastic component. On the other hand, observations have shown that not all thermoplastic materials are as sensitive to overheating as polyvinyl chloride and its copolymers and may tolerate longer residence times inside the die and extrusion lines or feed connections. Polyolefins, polyamides and similar thermoplastic materials do not show such high sensitivity providing the processing temperatures do not exceed certain known limits. In spite of these known factors, however, the production of multiple component tubular films using at least one component which is sensitive to overheating continues to present considerable difficulties. No suitable apparatus is available which takes these properties into account and which rules out the danger of melt deflections and excessively long residence times for at least one of the components.

One object of the present invention is to provide an apparatus for the continuous production of blown tubular films from thermoplastic materials in which it is ensured that at least one of the components to be processed is guided through the apparatus along the shortest possible path without any substantial deflections or differences in residence time.

It has now been found, in accordance with the invention, that such objects can be achieved by an apparatus for the production of a multilayer blown tubular thermoplastic film which includes an extrusion die rotatably mounted about a vertical working axis and coupled to a first screw extruder in which the screw axis coincides with said vertical working axis of the die, at least one additional screw extruder in feed connection with said die and mounted for rotation together with said die, fixed takeoff means including rollers to receive and flatten the extruded blown tube, and drive means to slowly rotate said die together with said at 'east one additional screw extruder about said vertical working axis.

This specified arrangement makes it possible, by virtue of the first screw extruder arranged on the axial extension of the rotatable extrusion die, to process a thermoplastic material which is sensitive to overheating and deflection, such as polyvinyl chloride, and to simultaneously deliver to the die less sensitive components, such as polyethylene or the like, through at least one laterally feed connected extruder, preferably with each such additional extruder arranged approximately parallel to the first extruder about a substantially vertical screw axis. Interruptions in continuous processing caused by excessive deflections of a melt path or deviations in residence times of the melt are effectively avoided.

Further, in the apparatus according to the invention, the object of producing a relative movement between the extrusion die and the winding unit is to avoid the accumulation of inevitable differences in wall thickness at any one point on the flattening or winding rollers. Accordingly, the expression "rotatable" or the like used in the context of this invention is understood to mean rotation which occurs not always in the same direction, but also a periodic reciprocating rotation, for example through an angle of about 340° to 360° or approximately 350°. The advantage of this pendulumlike or periodic back-and-forth rotational movement, which is generally known, is that the lines through which fluid heat exchange means are delivered to and removed from the additional extruders are easier to arrange because they can consist of flexible lines. In a preferred embodiment of the apparatus according to the invention, the extruder arranged on the axial extension of the extrusion die is stationary while the additional one or more extruders rotate together with the extrusion die. This can be achieved, for example, by securing the rotatable extrusion die and the additional extruder or extruders to a common rotating support or frame which has a rotary drive means common both to the die and to the extruder. In arrangements of this kind, the additional extruder or extruders are advantageously in the form of vertical extruders because in this way it is possible to obtain a particularly compact unit.

Figure 2:
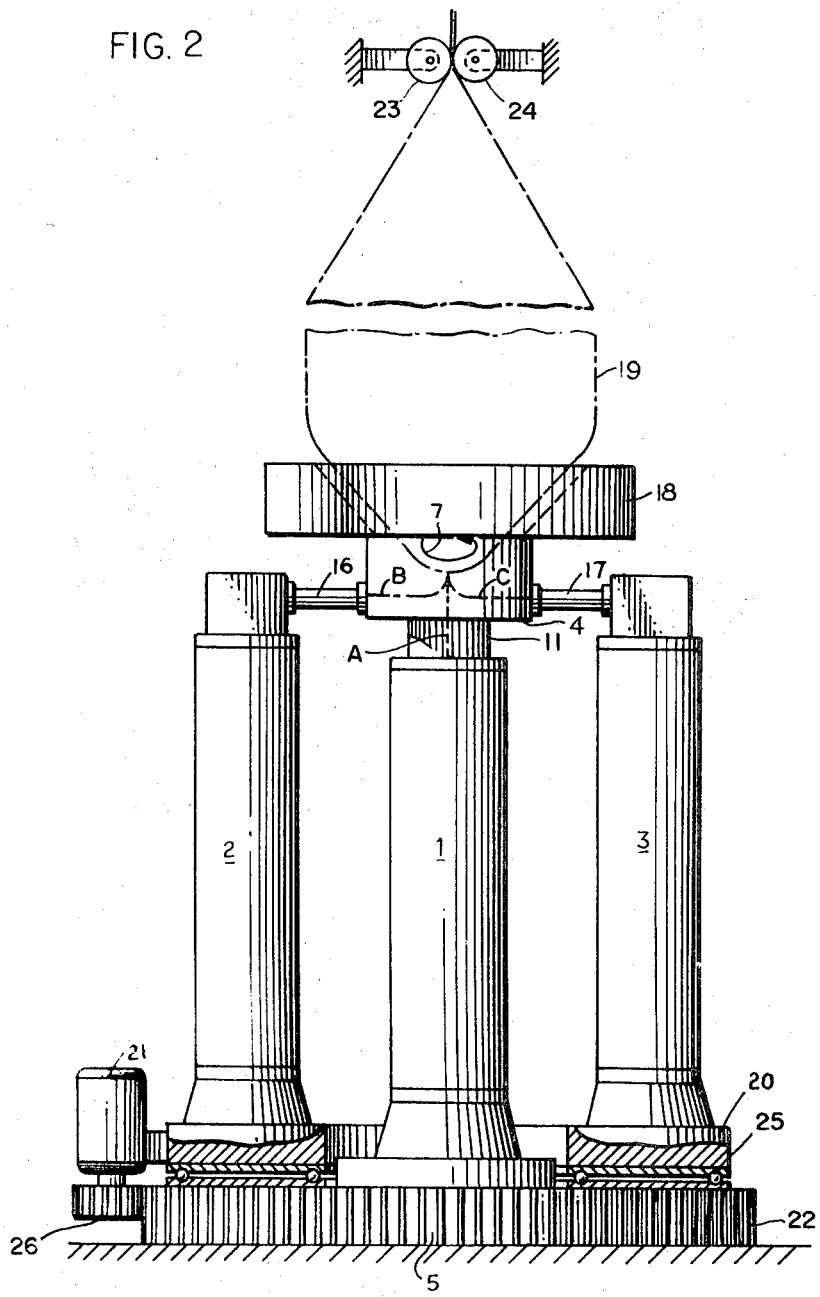

The invention is described in greater detail in conjunction with the accompanying drawings in which:

FIG. 1 is a partly schematic side plan view with portions in longitudinal section, illustrating one embodiment in which the first screw extruder is stationary and two additional extruders rotate together with the extrusion die while mounted on a common support which also rotates; and FIG. 2 is a similar side plan view of another embodiment in which again the first extruder is stationary and two additional extruders rotate together with the extrusion die but are supportably mounted on a circular rotatable turntable.

The apparatus shown in FIG. 1 is used for the production of a triple-layer blown film. The three thermoplastic polymer components are melted in the extruders 1, 2 and 3, which contain a conventional longitudinal screw, and are delivered as a melt to the extrusion and blowing die 4. The extruder 1 is arranged in such a way that its longitudinal screw shaft turns on an axis which is an extension of the axis of rotation of the extrusion die 4 so that the polymer component melted in this first extruder and delivered at its upper end to the die 4 is conveyed along a very short path without any appreciable deflection. In the example shown, the extruder 1 is mounted on a fixed base 5 with the result that is can be filled very easily from an annular hopper 6 which is illustrated in a vertical section with the feed opening 6a on one side of the lower end of the extruder 1. The necessary relative movement between the extrusion die 4 and the fixed nip rolls 23, 24 together with a conventional winding unit (not shown) is achieved by virtue of the fact that the extrusion die 4 can be rotated in the direction of arrow 7. For this purpose, the die 4 is secured to a rotary support member 8 having around its periphery a gear ring 9 which is engaged by a fixedly mounted drive means, such as motor 10 with the drive gear 10a. This motor driven gear rotates the rotary support 8. Between the extrusion die 4 and the fixed main extruder 1, there is provided a pressuretight slip coupling 11 which is constructed in a conventional manner so that details need not be illustrated. This coupling means 11 is preferably heated and contains a direct feed line from the outlet end of the extruder 1 to the die 4 as indicated by the broken line A.

As further shown in FIG. 1, two pedestals 12 and 13 provide a support at the lower end of the two additional extruders 2 and 3 and are firmly connected or anchored to the rotatable support 8 by means of the annular plate 8a. The pedestals 12 and 13 are thus carried by the supporting legs 14 and 15 and rotate with the geared support 8. The additional extruders 2 and 3, which by virtue of this satellite-like arrangement move around the main extruder, are coupled to the extrusion die through lateral feed lines 16 and 17. Those molten polymer components which are less sensitive to overheating and deflection are delivered to the die 4 through these feed lines as indicated by the broken lines B and C.

By reason of their rotation, the additional extruders 2 and 3 are not as easy to feed as the main extruder 1. However, since these additional extruders rotate only very slowly, it is possible without any difficulties to fill suitable reserve hoppers during this slow rotation from fixedly arranged supply containers, i.e., at regular feed intervals.

In order to provide electrical heating of the moving parts, e.g., the die 4 or the extruders 2, 3 and their feed lines, it is preferable to employ flexible cables or similar electrical conduits to supply the necessary energy requirements. On the other hand, a heating and/or cooling fluid can likewise be supplied to such moving parts through flexible fluid conduits, all such heating and cooling means being applied within the apparatus in a conventional manner. Each of the extruders 1, 2 and 3 is self-contained in the sense that the means for driving the screw or worm of the extruder is contained within the bottom portion of a suitable housing.

The individual polymer melts are conveniently brought together within the die or extrusion head 4 as indicated by the juncture of the feed paths A, B and C and then extruded through a conically widening annular slot. On the other hand, the feed paths A, B and C can remain separate within the extrusion head 4 so that the individual melts are separately extruded through concentric annular slots and joined together immediately after emerging from the upper face of the die. In all cases, however, the melt A follows a path which is as short as possible from the extruder 1 through the die 4, preferably along the coinciding axes of the extruder 1 and the die 4 until it diverges within the die through an annular channel. The extruders 2 and 3 are preferably placed as closely as possible to the main extruder 1 to shorten the distance of the feed lines 16 and 17.

A former 18 of conventional construction is used to guide the multilayer tubular film 19 as its issues from the extrusion die 4 and undergoes considerable expansion. This former or guide means is also arranged on the rotating support 8. An air feed tube (not shown) to supply air under pressure within the tubular film for the purpose of blowing or expanding the film is contained within the die 4 in a conventional manner, e.g., so as to emerge at the face of the die on its axis of rotation. This air feed tube can extend backwardly through the coupler 11 or may issue laterally from the rotatable die 4 for connection with a flexible air line. By injecting this air at a relatively high velocity and/or with insulation around its feed lines, it is often employed as a cooling means to rapidly solidify the extruded tubular film. However, its primary function is to expand the freshly extruded tubular film to a predetermined diameter, the air being trapped within the tube 19 by the nip rolls 23, 24 as the tube is being withdrawn. This air blowing or expansion of the tube is quite conventional, although it is preferred for purposes of the present invention to employ a rotatable extrusion head 4 which acts both as an annular extrusion die and a blowing head.

Another embodiment of the apparatus according to the invention is shown in FIG. 2. In this case, the main extruder 1 is also fixedly mounted on a stationary base 5 while the extrusion die 4 is rotatable relative to the main extruder through the provision of the slip coupling means 11. The two additional extruders 2 and 3 in this embodiment are mounted on a circular or annular base 20 which is rotatably mounted on the fixed base 5 by means of suitable roller bearings 25 or the like and can be rotatably driven for example by a gear 26 driven by motor 21 fixed to the base 20. For example, the gear 26 operatively engages a gear ring 22 provided around the periphery of the fixed base 5.

The embodiment shown in FIG. 2 is preferred in those cases where relatively large and heavy encased screws must be used for the additional extruders. In other respects, the construction and arrangement of the feed lines 16 and 17 connecting the additional extruders 2 and 3 to the die 4 as well as the former 18 and suitable means for withdrawing the blown tube to be flattened and collected are generally identical to the embodiment of FIG. 1.

As noted above, the one or more additional extruders can be secured and supported to a common rotatable support which also carries the extrusion die, or alternatively these additional extruders can be supported for rotation at their feed end or that end opposite to the melt outlet of the extruder. Preferably, both ends are supported as indicated in both FIGS. 1 and 2, the melt feed lines simultaneously proving at least some support. It is also possible to rest the additional extruders on base supporting wheels engaging suitably laid rails as the supporting means. On the other hand, the main extruder arranged on the vertical working axis of the extrusion die may also be mounted together with the additional extruders on a common turntable for rotation of the multi-extruder assembly.

Many other suitable variations in the construction and arrangement of the commonly rotated die and extruders as well as different drive means may be easily substituted within the scope of the invention, it being understood that the preferred embodiments disclosed herein have been set forth only by way of example.

The invention is hereby claimed as follows:

1. Apparatus for the extrusion of a multilayer blown tubular thermoplastic film which comprises:
   an extrusion die rotatably mounted about a vertical working axis and coupled to a first screw extruder in which the screw axis coincides with said vertical working axis of the die;
   at least one additional screw extruder in feed connection with said die and mounted for rotation together with said die;
   fixed takeoff means including rollers to receive and flatten the extruded blown tube; and drive means to slowly rotate said die together with said at least one additional screw extruder about said vertical working axis.

2. Apparatus as claimed in claim 1 wherein said first extruder is mounted in a fixed position with said die rotatably coupled thereto and each additional extruder arranged to rotate with said die.

3. Apparatus as claimed in claim 2 wherein said die and each additional extruder are secured to a common rotating support and said drive means is operatively connected to rotate said common support.

4. Apparatus as claimed in claim 1 wherein each additional extruder is arranged approximately parallel to said first extruder about a substantially vertical screw axis.

5. Apparatus as claimed in claim 2 wherein each additional extruder is arranged approximately parallel to said first extruder about a substantially vertical screw axis with a lateral feed connection between the outlet end of said additional extruder and said die.

6. Apparatus as claimed in claim 5 wherein each additional extruder is secured to said die for rotation therewith by said lateral feed connection and is further secured to said die by a common rotating support means.

7. Apparatus as claimed in claim 1 wherein said first extruder and each additional extruder are vertically supported on a common turntable.

8. Apparatus as claimed in claim 7 wherein each additional extruder has a lateral feed connection between its upper outlet end and said die and is carried at its lower end on an annular rotatable platform carried on a fixed base member which supports said first extruder in a fixed position.

9. Apparatus as claimed in claim 8 wherein said annular rotatable platform is operatively linked to said base member for rotation relative thereto by motor driven gear means.

10. Apparatus as claimed in claim 1 wherein said die together with said at least one additional screw extruder are positively driven for periodic reciprocating rotation through an angle of about 340° to 360°.

* * * * *